US012638796B2

(12) United States Patent
Uehara et al.

(10) Patent No.: US 12,638,796 B2
(45) Date of Patent: May 26, 2026

(54) FIXING DEVICE CAPABLE OF GROUNDING FIXING BELT AND PRESSURE ROLLER USING SINGLE RESISTIVE ELEMENT AND IMAGE FORMING APPARATUS

(71) Applicant: KYOCERA Document Solutions Inc., Osaka (JP)

(72) Inventors: Masakazu Uehara, Osaka (JP); Tomohiro Watatani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/053,981

(22) Filed: Feb. 14, 2025

(65) Prior Publication Data

US 2025/0264831 A1 Aug. 21, 2025

(30) Foreign Application Priority Data

Feb. 19, 2024 (JP) ................................ 2024-023266

(51) Int. Cl.

| | |
|---|---|
| ***G03G 15/20*** | (2006.01) |
| ***G03G 15/00*** | (2006.01) |
| ***G03G 21/16*** | (2006.01) |

(52) U.S. Cl.

CPC ..... *G03G 15/2053* (2013.01); *G03G 15/2064* (2013.01); *G03G 15/80* (2013.01); *G03G 21/1652* (2013.01); *G03G 2215/2035* (2013.01)

(58) Field of Classification Search

CPC ........... G03G 15/2017; G03G 15/2053; G03G 15/2064; G03G 15/80; G03G 21/1652; G03G 2215/2035

See application file for complete search history.

(56) References Cited

U.S. PATENT DOCUMENTS

| | | | | |
|---|---|---|---|---|
| 2005/0163540 A1 | 7/2005 | Umezawa et al. | | |
| 2013/0011156 A1 | 1/2013 | Misao | | |
| 2020/0272081 A1* | 8/2020 | Tanto | ................. | G03G 15/2064 |
| 2024/0319636 A1* | 9/2024 | Ikeda | ................. | G03G 15/2053 |

FOREIGN PATENT DOCUMENTS

| | | | |
|---|---|---|---|
| JP | 2005166299 | A | 6/2005 |
| JP | 2013117672 | A | 6/2013 |
| JP | 2013257466 | A | 12/2013 |

* cited by examiner

*Primary Examiner* — Sophia S Chen

(74) *Attorney, Agent, or Firm* — IP Busines Solutions, LLC.

(57) ABSTRACT

A fixing device includes: an endless fixing belt; a pressure roller capable of being brought into tight contact against the fixing belt; a heater which is provided on an inside of the fixing belt, receives through the fixing belt a pressure due to tight contact against the pressure roller, and heats the fixing belt; a support sheet metal which is provided in an interior of the fixing belt and supports the heater; a first conductive member, a second conductive member, and a resistive element. The first conductive member contacts an end of the support sheet metal projecting laterally beyond an edge of the fixing belt. The second conductive member contacts an end of the pressure roller. The first conductive member is engaged and connected to the second conductive member and the second conductive member is connected through the resistive element to a body to which the fixing device is mounted.

5 Claims, 13 Drawing Sheets

FIXING DEVICE CAPABLE OF GROUNDING FIXING BELT AND PRESSURE ROLLER USING SINGLE RESISTIVE ELEMENT AND IMAGE FORMING APPARATUS

INCORPORATION BY REFERENCE

This application claims priority to Japanese Patent Application No. 2024-023266 filed on 19 Feb. 2024, the entire contents of which are incorporated by reference herein.

BACKGROUND

The present disclosure relates to fixing devices capable of fixing an image formed on a recording paper sheet by passing the recording paper sheet through a nip area between an endless fixing belt and a pressure roller and image forming apparatuses using the fixing devices.

A fixing device brings a pressure roller into tight contact against an endless fixing belt to create a nip area between the fixing belt and the pressure roller and allows a recording paper sheet to pass through the nip area to fix an image formed on the recording paper sheet. In the fixing device, for the sake of safety, the fixing belt and the pressure roller should preferably be appropriately connected to a grounding portion of the fixing device.

For example, there is known a general image forming apparatus including a fixing device using a film heating method. The fixing device using a film heating method includes a cylindrical film, a heater in contact with the inner periphery of the film, and a pressure roller forming a nip area through the film together with the heater, wherein the heater is grounded through the film, the pressure roller, and a resistive element to a frame ground (hereinafter, referred to as an FG) of an apparatus body.

If, in the above structure, a discharge occurs between the film and the FG, a voltage dividing effect of the resistive element between the pressure roller and the FG cannot be obtained, a high-potential surge voltage is applied to a protective layer for the heater and, thus, the protective layer for the heater is dielectrically broken down. Therefore, in the general image forming apparatus as described above, a power-supply line connected to the heater is provided with a lightning arrester capable of discharging at a stable voltage regardless of the polarity of the surge voltage, thus preventing a high-potential surge voltage from being applied to the heater.

There is also known a general fixing device which includes a fixing film, a heater that heats the fixing film, and a pressure roller that forms a nip area together with the fixing film when brought into tight contact against the fixing film, and in which a roller including a conductive rubber and an insulating or high-resistance releasable layer is used as the pressure roller.

In this general fixing device, two resistive elements having different resistances are provided in parallel between the pressure roller and a grounding portion of the fixing device and appropriately selected to ground the pressure roller. Under this structure, in the general fixing device described above, the voltage applied to the fixing belt is gradually increased until it reaches a specified voltage value, thus preventing the occurrence of pinhole leakage of the releasable layer of the pressure roller.

SUMMARY

A technique improved over the aforementioned techniques is proposed as one aspect of the present disclosure.

A fixing device according to an aspect of the present disclosure includes an endless fixing belt, a pressure roller, a heater, a support sheet metal, a first conductive member, a second conductive member, and a resistive element. The pressure roller is capable of being brought into tight contact against the fixing belt. The heater is provided on an inside of the fixing belt, receives through the fixing belt a pressure due to tight contact against the pressure roller, and heats the fixing belt. The support sheet metal is provided in an interior of the fixing belt and supports the heater. The first conductive member contacts an end of the support sheet metal projecting laterally beyond an edge of the fixing belt. The second conductive member contacts an end of the pressure roller. The first conductive member is engaged and connected to the second conductive member and the second conductive member is connected through the resistive element to a body to which the fixing device is mounted.

An image forming apparatus according to another aspect of the present disclosure includes the above-described fixing device and an image forming device. The image forming device forms an image on a recording paper sheet. The fixing device pinches the recording paper sheet in a nip area between the fixing belt and the pressure roller and fixes the image formed on the recording paper sheet by heat and pressure.

DETAILED DESCRIPTION

Figure 1:
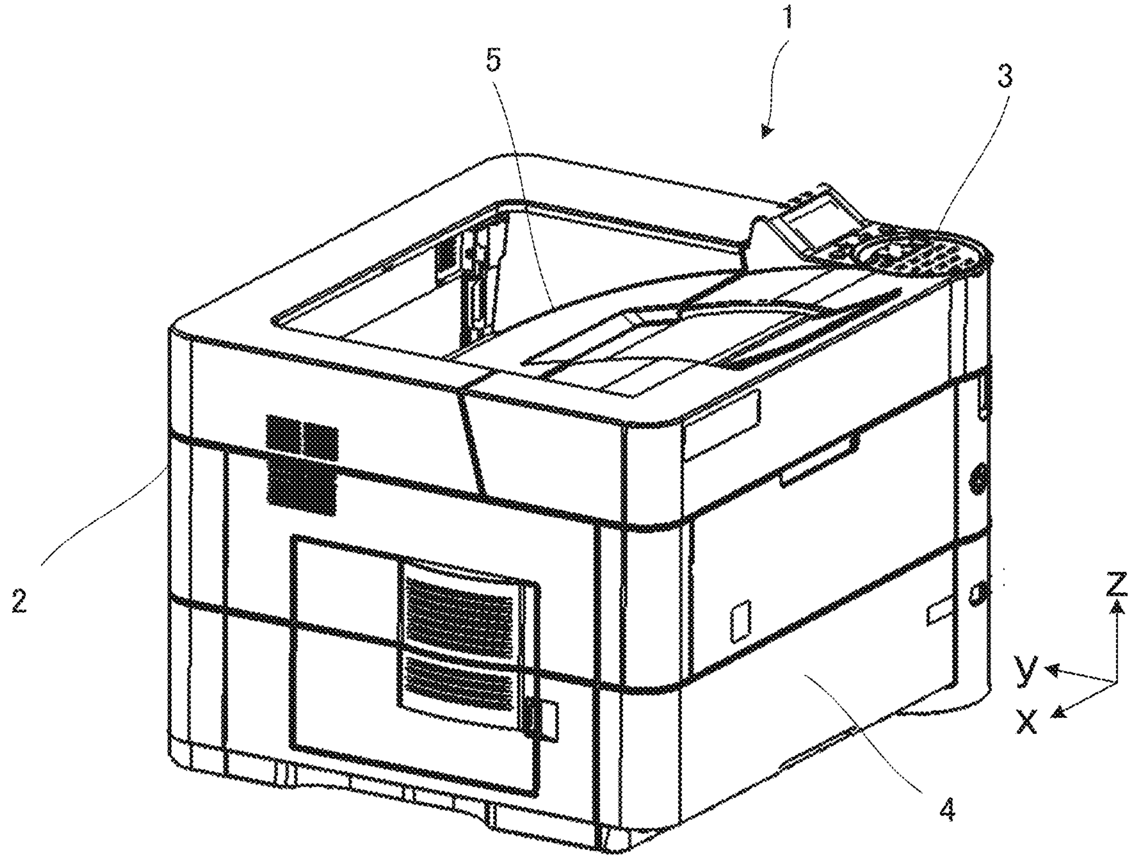
FIG. 1 is a perspective view showing an appearance of an image forming apparatus to which a fixing device according to an embodiment of the present disclosure is applied.
Figure 2:
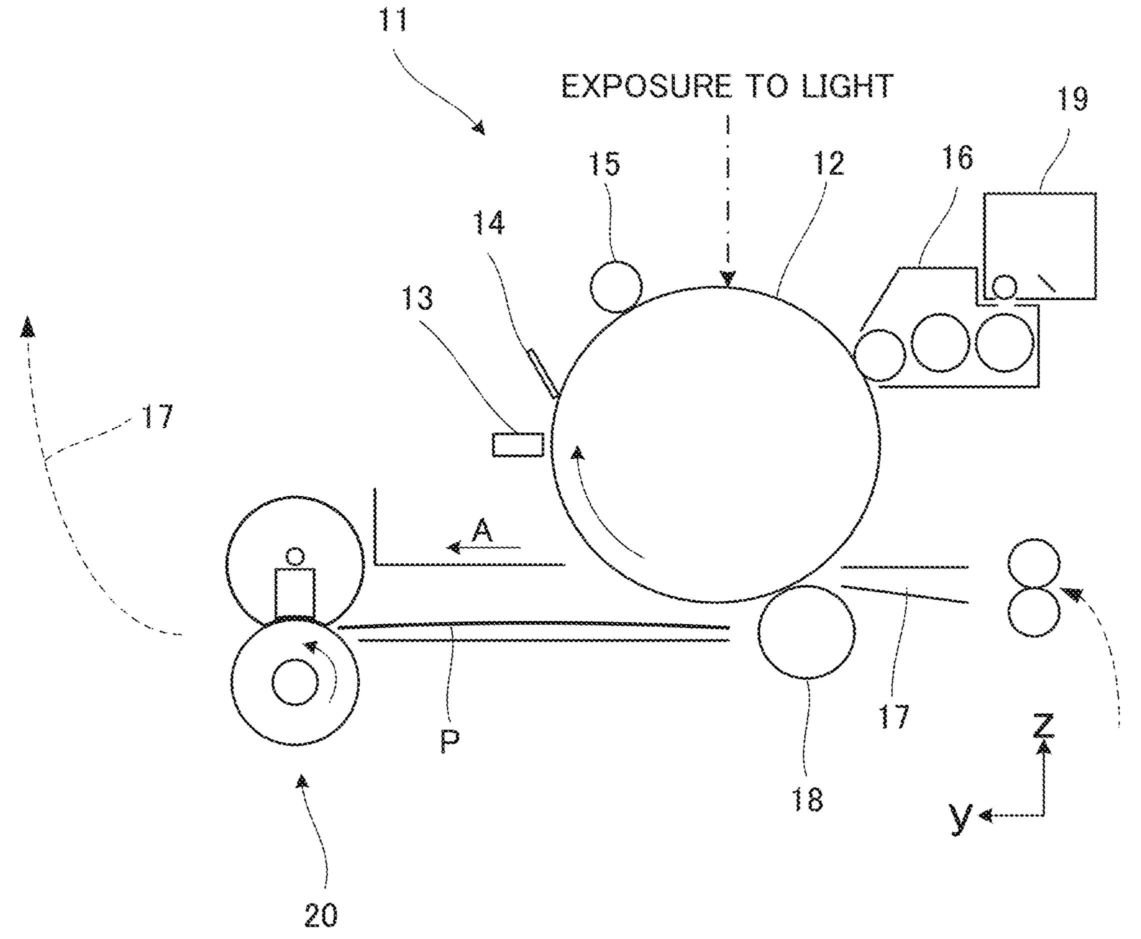
FIG. 2 is a cross-sectional view schematically showing an image forming device and the fixing device.

Hereinafter, a description will be given of an embodiment of the present disclosure with reference to the drawings. FIG. 1 is a perspective view showing an appearance of an image forming apparatus 1 to which a fixing device according to an embodiment of the present disclosure is applied. FIG. 2 is a cross-sectional view schematically showing an image forming device 11 and a fixing device 20 in the image forming apparatus 1. In FIGS. 1 to 12, the directions of the arrow x, the arrow y, and the arrow z represent the depthwise direction, the widthwise direction, and the heightwise direction, respectively.

As shown in FIGS. 1 and 2, an apparatus body 2 of the image forming apparatus 1 is provided with a plurality of components for implementing various functions of the image forming apparatus 1. For example, the apparatus body 2 is provided with an image forming device 11, a fixing device 20, an operation device 3, a sheet feed cassette 4, a sheet output tray 5, and so on.

The image forming device 11 forms an image represented by image data on a recording paper sheet P fed from the sheet feed cassette 4. The recording paper sheet P with the image formed thereon is subjected to fixation processing by the fixing device 20 and then ejected to the sheet output tray 5.

The operation device 3 includes, for example, a start key, a determination key for use in determining inputs on various operations, numerical entry keys for use in entering numerical values, and so on. The operation device 3 accepts user's instructions regarding various types of operations and processing. The operation device 3 includes a display device that displays operation guidance and other types of information for the user.

The image forming device 11 electrophotographically forms a toner image on a recording paper sheet P fed from the sheet feed cassette 4. The image forming device 11 includes a photosensitive drum 12, a destaticizing device 13, a cleaning device 14, a charging device 15, a developing device 16, a toner container 19, and so on.

The photosensitive drum 12 rotates in the direction of the arrow. The destaticizing device 13 removes electric charge on the surface of the photosensitive drum 12. The cleaning device 14 cleans the surface of the photosensitive drum 12. The charging device 15 uniformly charges the surface of the photosensitive drum 12. The developing device 16 develops an electrostatic latent image, which has been formed on the surface of the photosensitive drum 12 when exposed to light by the exposure device, into a toner image. The toner container 19 supplies toner to the developing device 16.

The photosensitive drum 12 is pressed by and against a transfer roller 18 provided below the photosensitive drum 12 to create a nip area between the photosensitive drum 12 and the transfer roller 18.

A recording paper sheet P fed from the sheet feed cassette 4 is conveyed in the direction of the arrow A through a conveyance path 17. The recording paper sheet P is passed through the nip area between the photosensitive drum 12 and the transfer roller 18 and, thus, the toner image on the surface of the photosensitive drum 12 is transferred to the recording paper sheet P. The recording paper sheet P is conveyed to the fixing device 20. Heat and pressure are applied to the recording paper sheet P by the fixing device 20 and, thus, the toner image on the recording paper sheet P is fixed. The recording paper sheet P is then conveyed from the fixing device 20 through the upwardly curved conveyance path 17 and ejected to the sheet output tray 5 provided on the top of the image forming apparatus 1.

Figure 3:
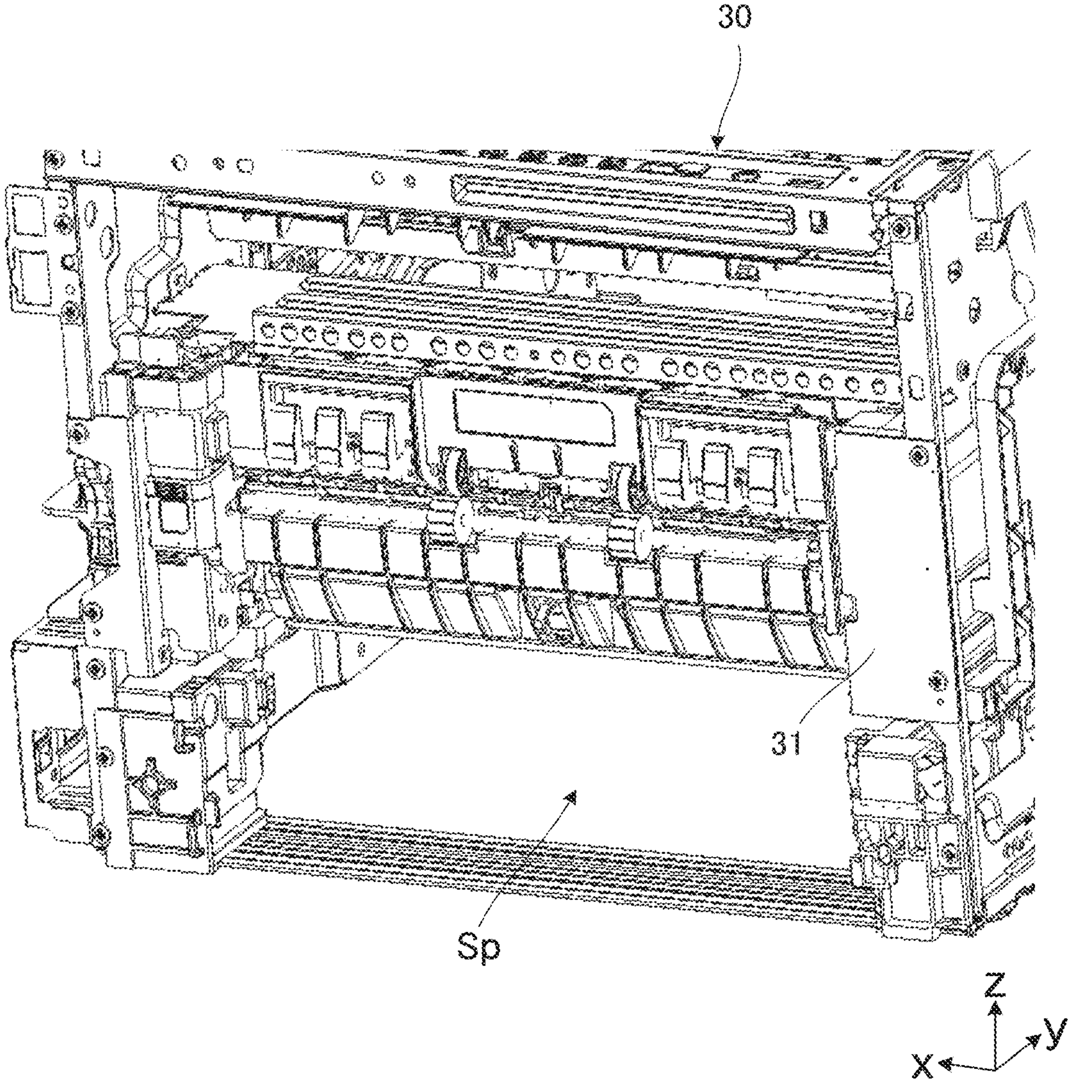
FIG. 3 is a perspective view showing an internal structure of the image forming apparatus.

FIG. 3 is a perspective view showing an internal structure of the image forming apparatus 1. As shown in FIG. 3, the image forming apparatus 1 includes a body frame 30 constructed by combining molded members made of synthetic resin and sheet metals. The body frame 30 supports the components of the image forming apparatus 1. A space Sp into and out of which the sheet feed cassette 4 is to be inserted and pulled is provided below the body frame 30. The image forming device 11 is mounted in the back side of the body frame 30 above the space Sp and the fixing device 20 is mounted in the near side of the body frame 30 above the space Sp.

Figure 4:
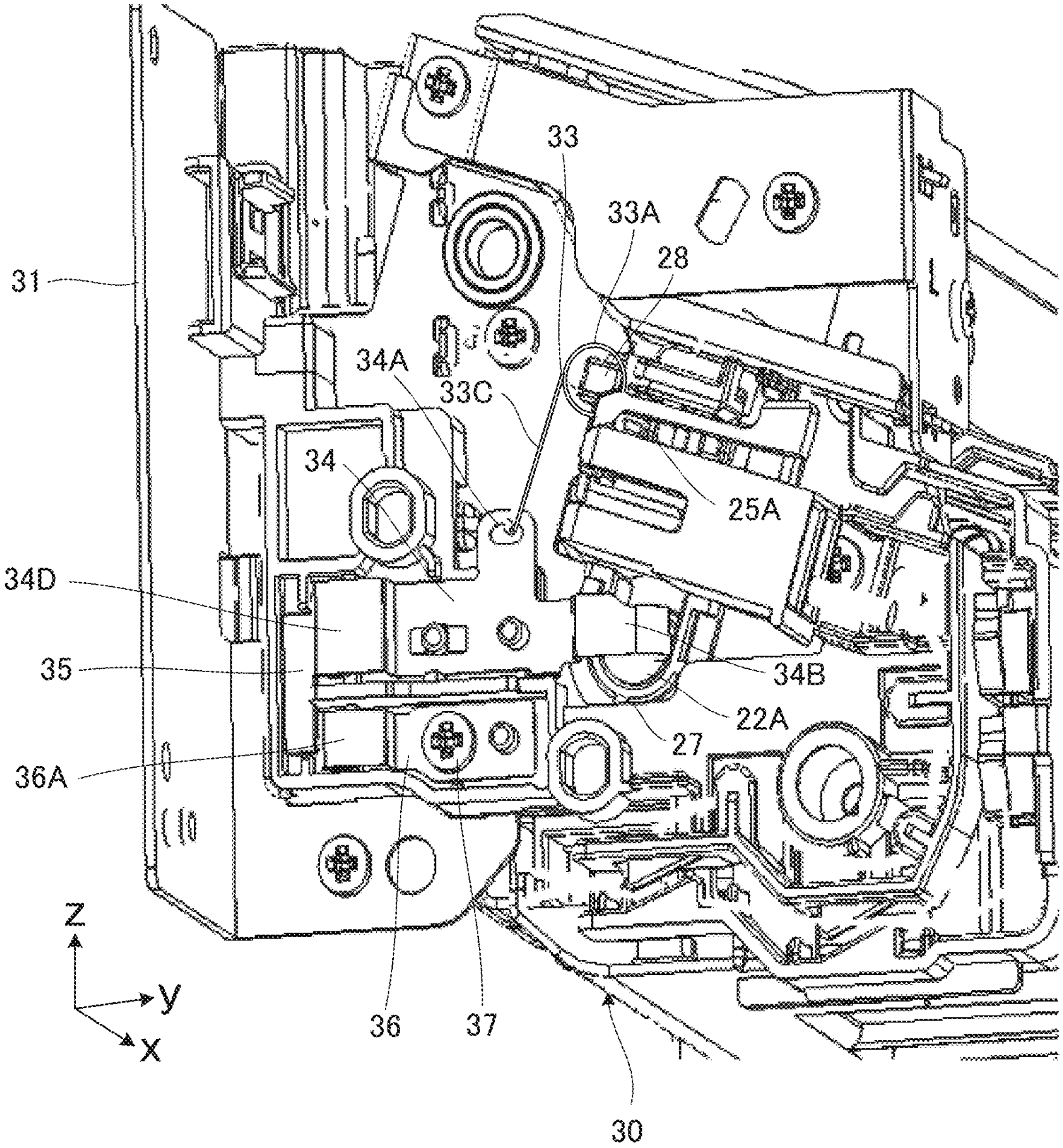
FIG. 4 is a perspective view showing one end of a near-side portion of a body frame equipped with the fixing device when viewed diagonally below.

FIG. 4 is a perspective view showing one end of a near-side portion of the body frame 30 equipped with the fixing device 20 when viewed diagonally below. As shown in FIG. 4, a frame side plate 31 made of metal is provided on the one end of the near-side portion of the body frame 30. As will be described in detail later, one end of a shaft 22A of the pressure roller 22 of the fixing device 20 is supported at the one end of the near-side portion of the body frame 30 and one end 25A of a stay sheet metal 25 for the fixing belt 21 projects at the one end of the near-side portion of the body frame 30.

Figure 5:
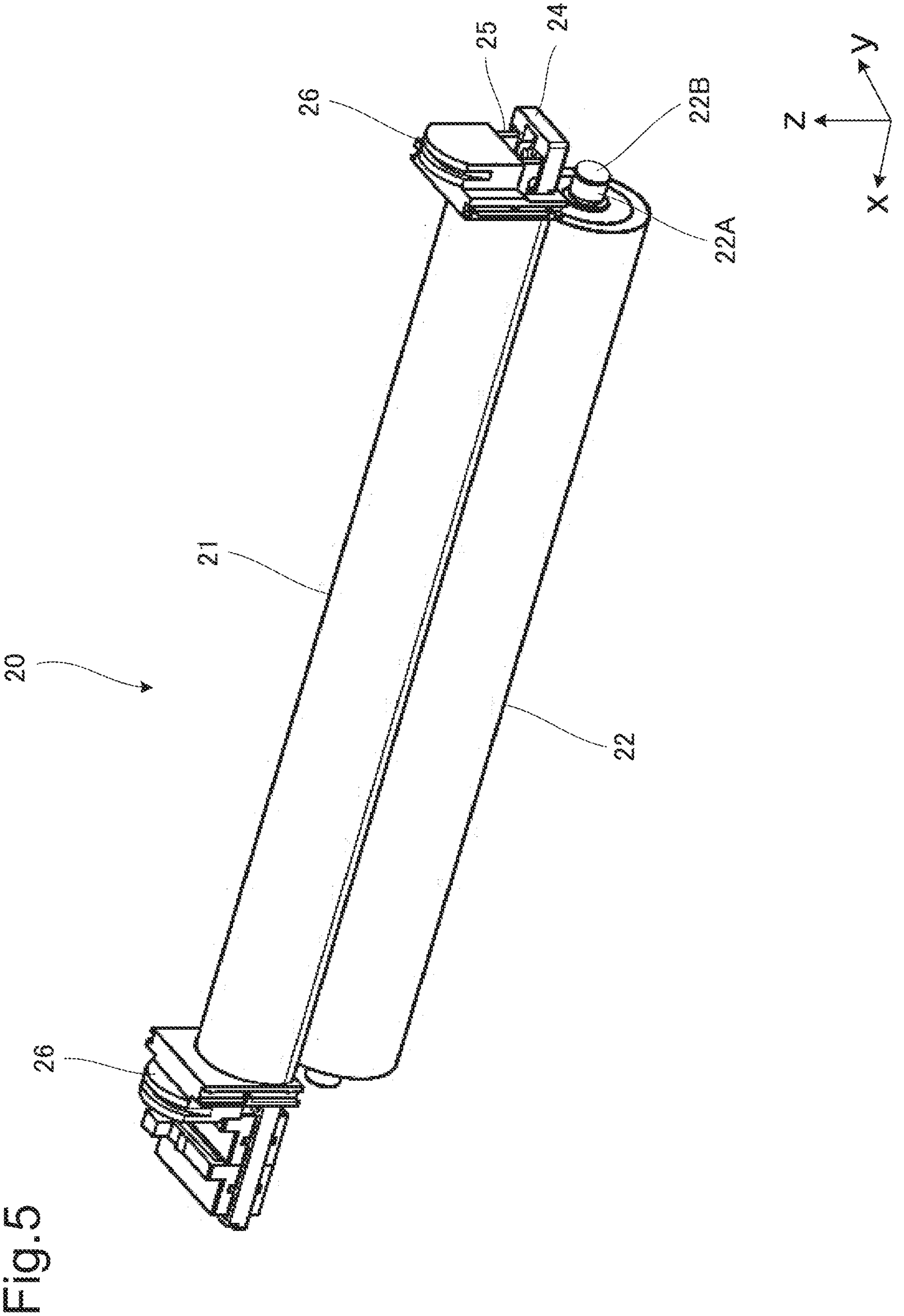
FIG. 5 is a perspective view showing the fixing device.
Figure 6A:
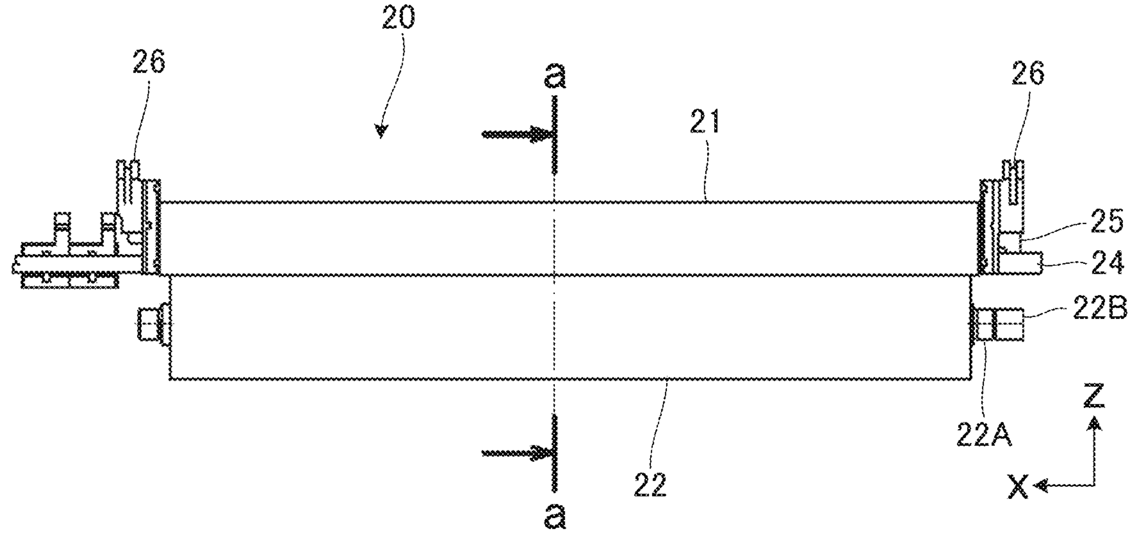
FIG. 6A is a front view showing the fixing device.
Figure 6B:
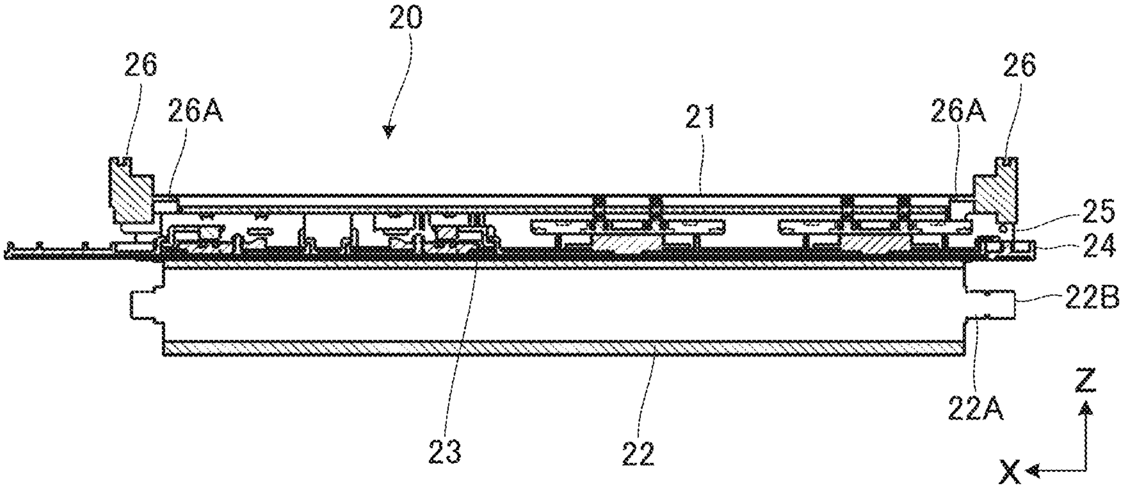
FIG. 6B is a cross-sectional view showing the fixing device when taken along the line b-b in FIG. 7A.
Figure 7A:
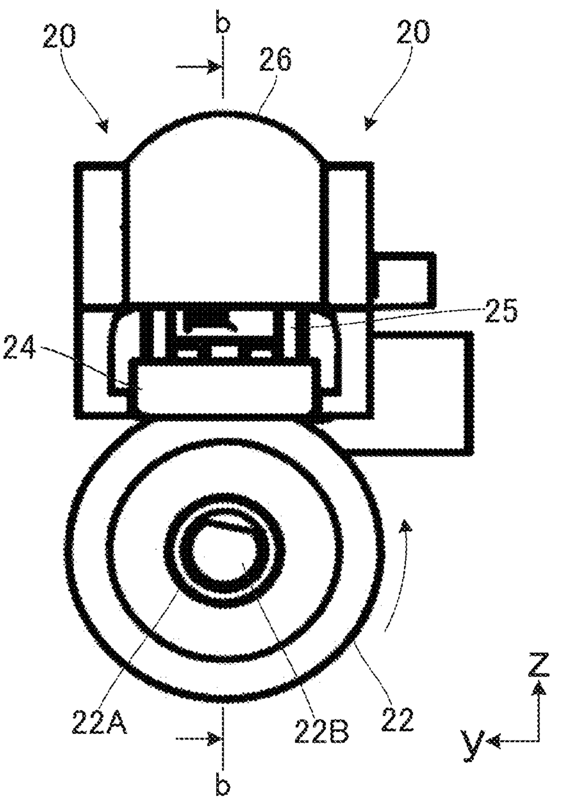
FIG. 7A is a side view showing the fixing device.
Figure 7B:
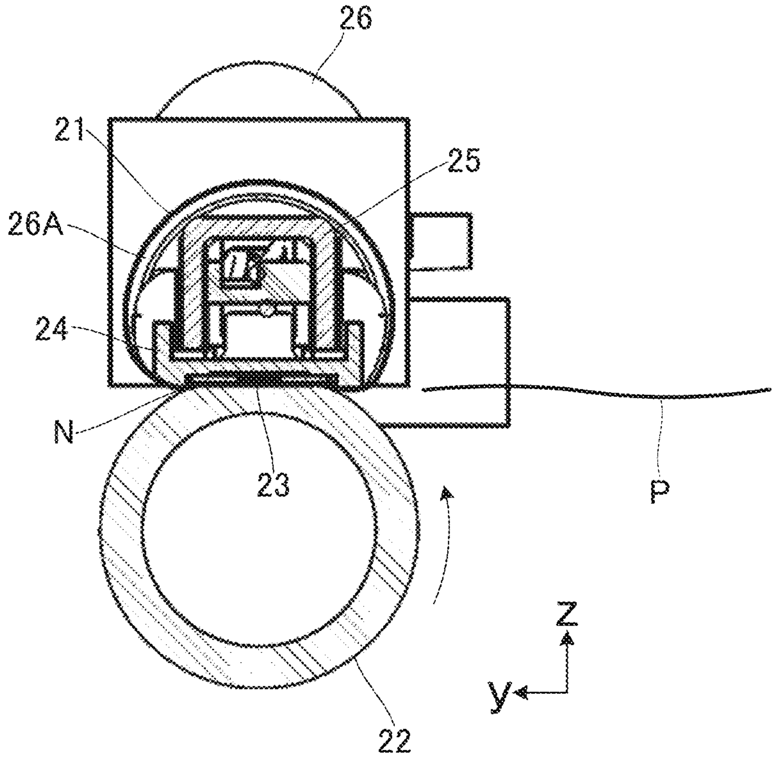
FIG. 7B is a cross-sectional view showing the fixing device when taken along the line a-a in FIG. 6A.

Next, a description will be given in detail of the fixing device 20. FIG. 5 is a perspective view showing the fixing device 20. FIG. 6A is a front view showing the fixing device 20. FIG. 6B is a cross-sectional view showing the fixing device 20 when taken along the line b-b in FIG. 7A. FIG. 7A is a side view showing the fixing device 20. FIG. 7B is a cross-sectional view showing the fixing device 20 when taken along the line a-a in FIG. 6A.

As shown in FIGS. 5, 6A, 6B, 7A, and 7B, the fixing device 20 includes the fixing belt 21, the pressure roller 22, a sheet heater 23, a heater holder 24, the stay sheet metal 25, a pair of holders 26, and so on. The sheet heater 23 corresponds to the heater defined in CLAIMS and the stay sheet metal 25 corresponds to the support sheet metal defined in CLAIMS.

The fixing belt 21 is an endless belt. The fixing belt 21 is a sheet-shaped belt in which a base material layer made of metal, synthetic resin or others, an elastic layer made of silicone rubber or others, a releasable layer made of synthetic resin or others, and so on are layered one on another. The fixing belt 21 has flexibility.

The pair of holders 26 are molded products made of synthetic resin. The pair of holders 26 include respective annular frame portions 26A. When both the annular frame portions 26A are inserted into the inside of the fixing belt 21 from both the edges (lateral ends) of the fixing belt 21, the outer peripheries of the annular frame portions 26A come into contact with the both lateral end portions of the inner periphery of the fixing belt 21 and, thus, the fixing belt 21 is held by the pair of holders 26.

The interior of the fixing belt 21 is provided with the sheet heater 23, the heater holder 24, and the stay sheet metal 25. The sheet heater 23 is in sliding contact with a lower portion of the inner periphery of the fixing belt 21. The heater holder 24 supports the sheet heater 23. The stay sheet metal 25 supports the heater holder 24.

The sheet heater 23, the heater holder 24, and the stay sheet metal 25 extend in the longitudinal direction of the fixing belt 21 and project beyond both the edges of the fixing belt 21. The heater holder 24 is a molded product made of synthetic resin.

The stay sheet metal 25 is formed in the shape of a U-section, for example, by sheet-metal working and has a sufficient strength and rigidity. Each of the holders 26 is supported by the body frame 30 to which the fixing device 20 is mounted, the stay sheet metal 25 is supported at both ends by the respective holders 26, the heater holder 24 is supported by the stay sheet metal 25, and the sheet heater 23 is held by the heater holder 24.

Therefore, the stay sheet metal 25 is supported by the pair of holders 26 and thus supports the heater holder 24 and the sheet heater 23. As a result, the pair of holders 26, the stay sheet metal 25, the heater holder 24, and the sheet heater 23 are integrally supported.

The pressure roller 22 is composed of: a metallic cylinder or cylindrical solid; and a layer made of synthetic resin or others and covering the outer periphery of the cylinder or cylindrical solid. The shaft 22A of the pressure roller 22 is supported rotatably by a sliding bearing 27 and provided in parallel with the center of rotation of the fixing belt 21. The sliding bearing 27 is a molded product of synthetic resin. The sliding bearing 27 is opened at the top and receives the shaft 22A of the pressure roller 22 through the open space in the top thereof to thus support the shaft 22A rotatably.

The pair of holders 26 are supported, at both lateral sides of the body frame 30 to which the fixing device 20 is mounted, movably toward and away from the shaft 22A of the pressure roller 22. The fixing belt 21 is disposed above the pressure roller 22. Each of the holders 26 is moved downward and toward the shaft 22A of the pressure roller 22 by a biasing force of a spring or the like. The stay sheet metal 25, the heater holder 24, and the sheet heater 23 are also moved downward by the biasing force.

Thus, the fixing belt 21 is moved closer to and brought into tight contact against the pressure roller 22 and the pressure roller 22 is pressed through the fixing belt 21 against the sheet heater 23. As a result, the outer periphery of the pressure roller 22 and the outer periphery of the fixing belt 21 are brought into tight contact with each other over a wide range and a nip area N is created over the wide range.

When the rotary drive force of a motor is transmitted to the shaft 22A of the pressure roller 22 and, thus, the pressure roller 22 is driven into rotation in the direction of the arrow, the fixing belt 21 is rotated in a direction opposite to the direction of rotation of the pressure roller 22. Furthermore, the sheet heater 23 is activated to apply heat to the fixing belt 21 and, thus, the temperature of the fixing belt 21 is set at a specified temperature suitable for fixation.

When in this state a recording paper sheet P is conveyed to the nip area N, heat and pressure are applied to the recording paper sheet P in the nip area N and, thus, the toner image on the recording paper sheet P is fixed by heat and pressure.

In the general image forming apparatus described previously, the heater is grounded through the film, the pressure roller, and the resistive element. However, because the film is made of an insulating material, the heater, the film, and the pressure roller in the above structure cannot be said to be grounded in terms of direct current and the structure is that for addressing a pulsed surge voltage.

Furthermore, although in the general fixing device described previously the pressure roller is grounded through either one of the two resistive elements, the grounding of the heater is not taken into consideration.

For example, when a paper jam or the like occurs between the fixing belt and the pressure roller, the user does the work of removing the jammed recording paper sheet. Therefore, in order to ensure the safety of the user's work, the fixing belt, the heater, the pressure roller, and so on should preferably be grounded through respective resistive elements having respective appropriate resistances.

However, both the above-described general image forming apparatus and fixing device are not configured to ground the fixing belt and the pressure roller through respective resistive elements.

Unlike the above general techniques, in the above embodiment, the stay sheet metal 25 of the fixing belt 21 and the pressure roller 22 are grounded through a resistive element having an appropriate resistance for each of these components in order to ensure the safety of the user's work of removing a jammed recording paper sheet P.

In addition, since the fixing belt 21, the sheet heater 23, and the heater holder 24 are in contact with or have a very short insulation distance from the stay sheet metal 25, the fixing belt 21, the sheet heater 23, and the heater holder 24 are also grounded through the resistive element.

Meanwhile, generally, when two electric current paths are provided for the purpose of grounding the fixing belt and the pressure roller through respective resistive elements, this may present problems of increased size of the device and increased complexity in structure. With respect to these problems, in the fixing device 20 according to the above embodiment, both the fixing belt 21 and the pressure roller 22 are grounded, but the current paths for the grounding is simplified by the use of a single resistive element 35 for the grounding.

As shown in FIG. 4, one end of the shaft 22A of the pressure roller 22 of the fixing device 20 is supported at the one end of the near-side portion of the body frame 30 and the one end 25A of the stay sheet metal 25 projecting beyond an edge of the fixing belt 21 projects at the one end of the near-side portion of the body frame 30.

Figure 8:
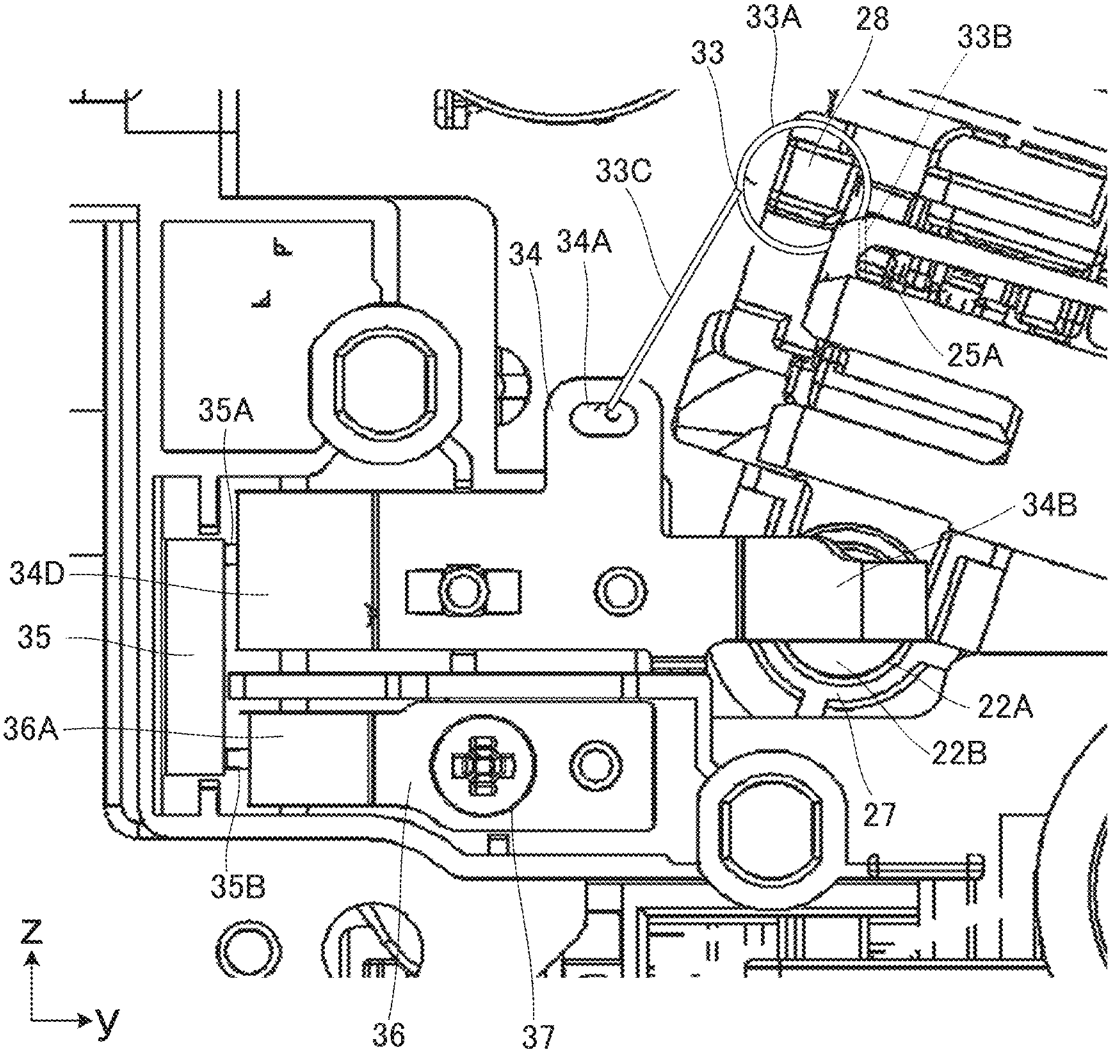
FIG. 8 is a side view showing in magnification the one end of the near-side portion of the body frame.

FIG. 8 is a side view showing in magnification the one end of the near-side portion of the body frame 30. As shown in FIGS. 4 and 8, the frame side plate 31, a torsion spring 33, an upper conductive plate 34, the resistive element 35, a lower conductive plate 36, and a screw 37 are provided at the one end of the near-side portion of the body frame 30. The torsion spring 33, the upper conductive plate 34, the lower conductive plate 36, and the screw 37 are made of metal and have electric conductivity.

The torsion spring 33 corresponds to the first conductive member defined in CLAIMS, the upper conductive plate 34 corresponds to the second conductive member defined in CLAIMS, and the lower conductive plate 36, the screw 37, and the frame side plate 31 correspond to at least one different conductive member defined in CLAIMS.

As described previously, the body frame 30 is constructed by combining synthetic resin molded members and sheet metal members. The upper conductive plate 34 and the lower conductive plate 36 are secured at fixed positions on the synthetic resin molded member of the body frame 30 and are mutually insulated. The resistive element 35 is connected via respective leads 35A and 35B thereof to the upper conductive plate 34 and the lower conductive plate 36, respectively. The screw 37 connects and fastens the lower conductive plate 36 to the metallic frame side plate 31. The screw 37 makes the lower conductive plate 36 and the frame side plate 31 electrically connected with each other.

Figure 9:
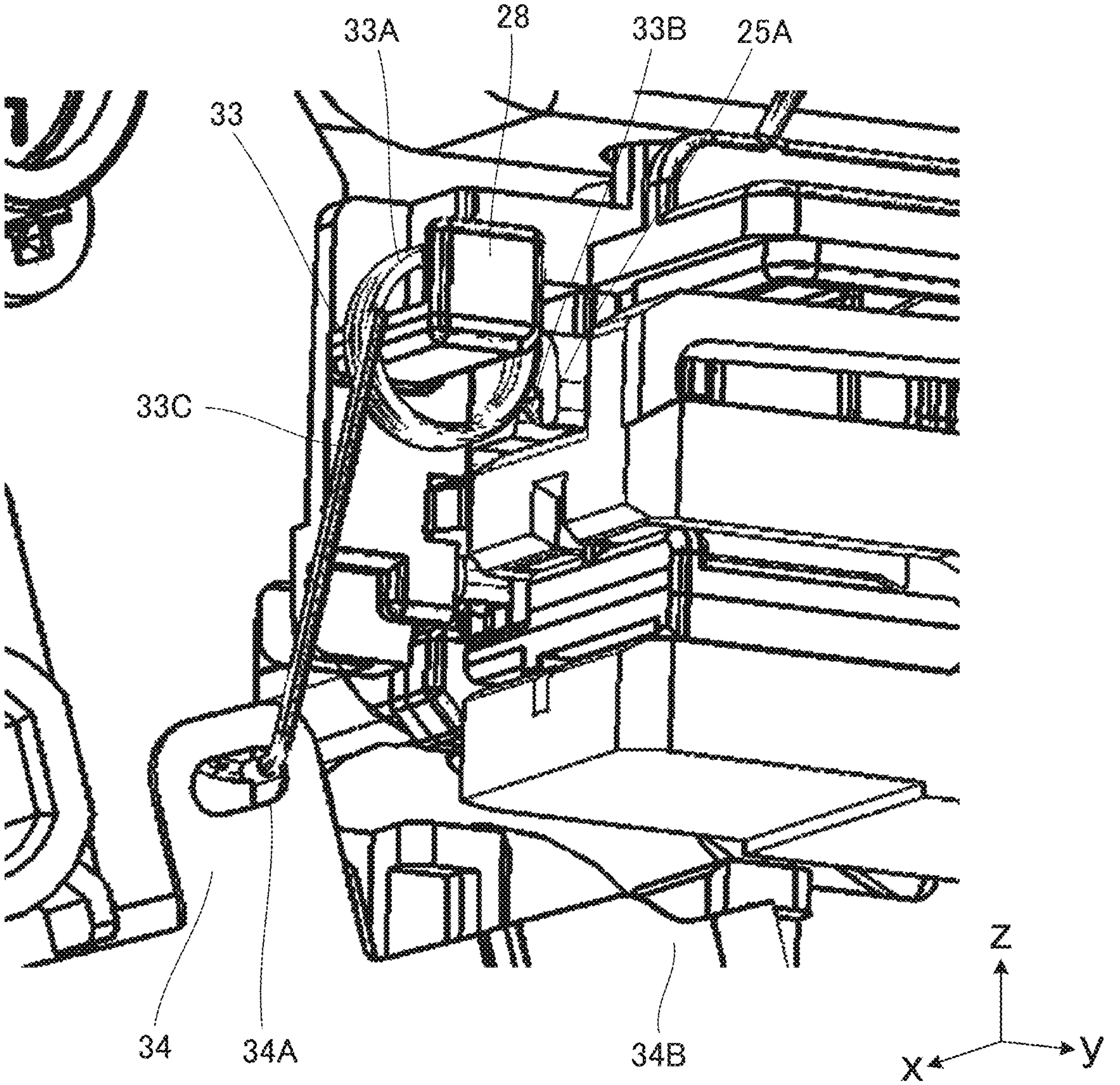
FIG. 9 is a perspective view showing in magnification an end of a stay sheet metal, a torsion spring, an upper conductive plate, and surrounding portions of them.

FIG. 9 is a perspective view showing in magnification the one end 25A of the stay sheet metal 25, the torsion spring 33, the upper conductive plate 34, and surrounding portions of them. As shown in FIGS. 9 and 8, a ring-shaped portion 33A of the torsion spring 33 is fitted on a projection 28 as a separate member provided on an end of the holder 26 and, thus, the torsion spring 33 is supported by the projection 28. One arm 33B of the torsion spring 33 contacts the one end 25A of the stay sheet metal 25 and, thus, the torsion spring

33 is electrically connected with the stay sheet metal 25. The other arm 33C of the torsion spring 33 is bent and inserted into an engagement hole 34A of the upper conductive plate 34 and, thus, the torsion spring 33 contacts and is electrically connected with the upper conductive plate 34.

The torsion spring 33 biases its arms 33B and 33C toward spreading them apart. Thus, even when the stay sheet metal 25 moves with the movement of the holders 26, the contact of the one arm 33B with the one end 25A of the stay sheet metal 25 and the contact of the other arm 33C with the engagement hole 34A of the upper conductive plate 34 are maintained.

Figure 10:
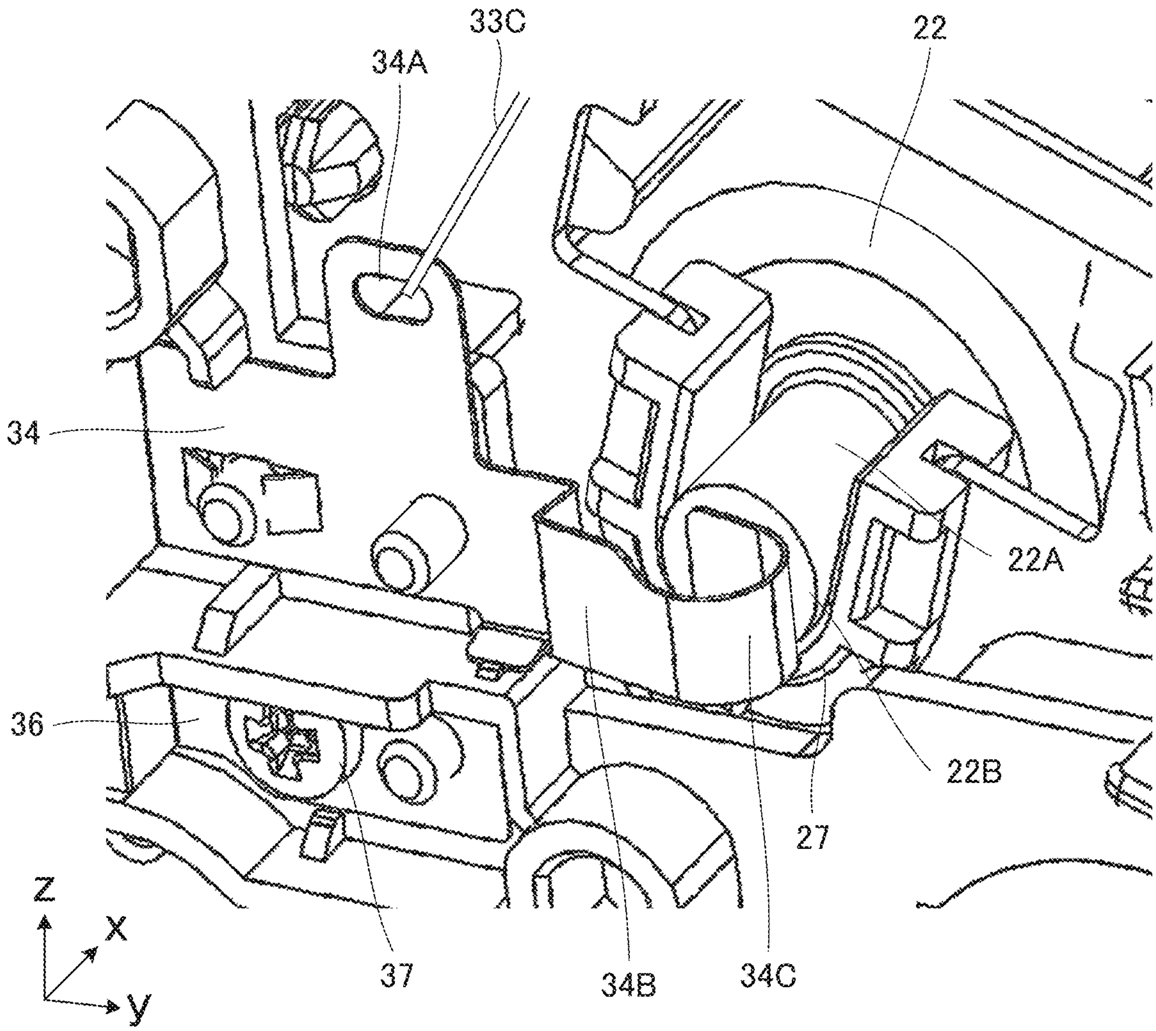
FIG. 10 is a perspective view showing in magnification the upper conductive plate, a shaft of a pressure roller, and surrounding portions of them.

FIG. 10 is a perspective view showing in magnification the upper conductive plate 34, the shaft 22A of the pressure roller 22, and surrounding portions of them. As shown in FIG. 10, the upper conductive plate 34 includes a bent portion 34B. A distal side of the bent portion 34B is formed into a distal portion 34C having a U-shape as viewed from above. The upper conductive plate 34 is electrically connected with the shaft 22A of the pressure roller 22 by elastically deforming the bent portion 34B to press the distal portion 34C against the shaft 22A by the elastic force of the bent portion 34B.

Figure 11:
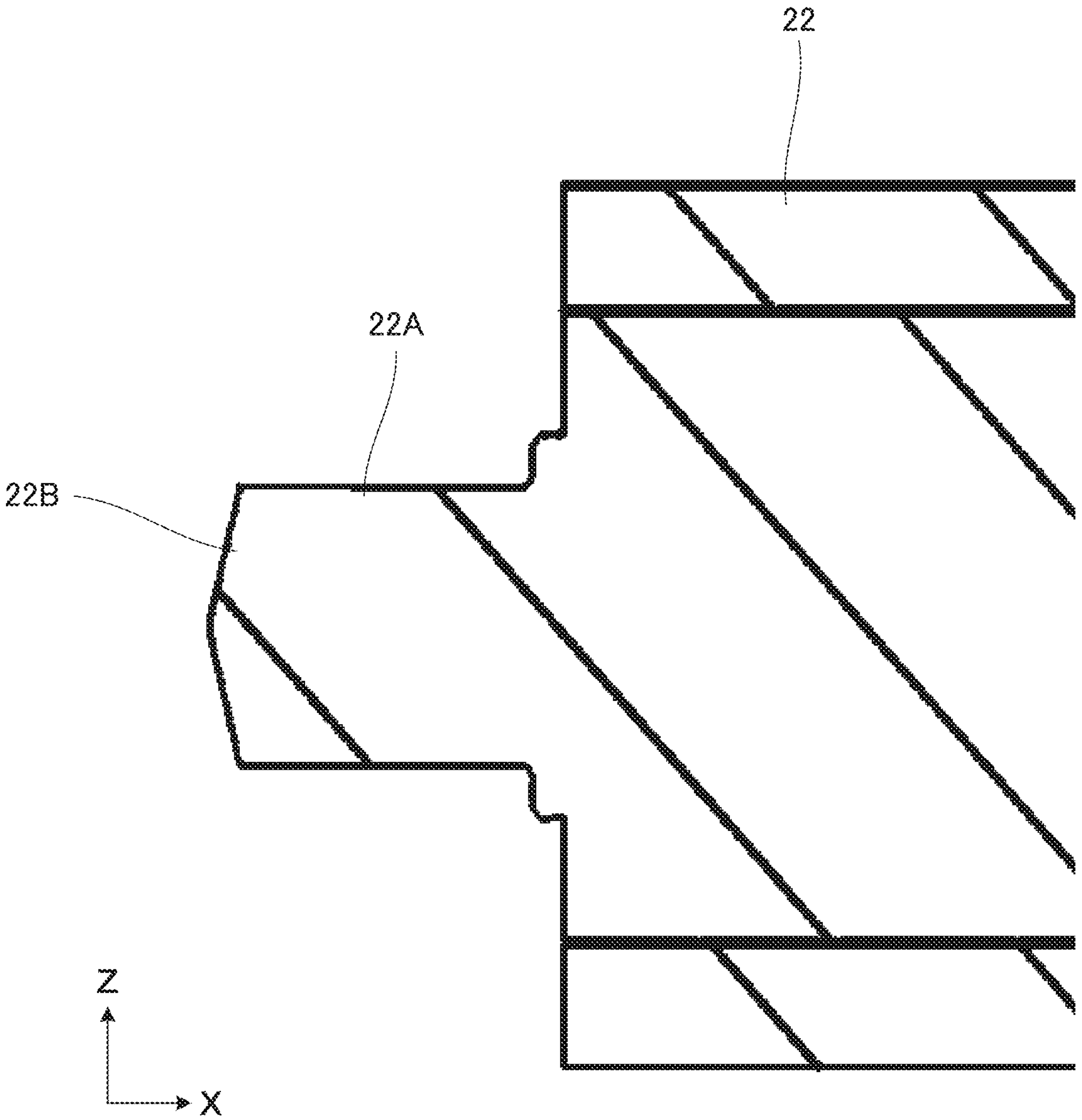
FIG. 11 is a cross-sectional view showing the profile of an end portion of a shaft of the pressure roller.

FIG. 11 shows the profile of an end portion of the shaft 22A of the pressure roller 22. As shown in FIG. 11, the end 22B of the shaft 22A of the pressure roller 22 is formed into a conical shape having an apex at which the center of rotation of the pressure roller 22 projects farthest laterally in the direction of extension of the shaft 22A. Therefore, even when the shaft 22A of the pressure roller 22 rotates, the position of the apex of the shaft 22A remains unchanged and the apex of the shaft 22A is always brought into tight contact against a fixed point of the distal portion 34C of the bent portion 34B. As a result, electrical connection between the shaft 22A of the pressure roller 22 and the upper conductive plate 34 can be stably maintained.

Figure 12:
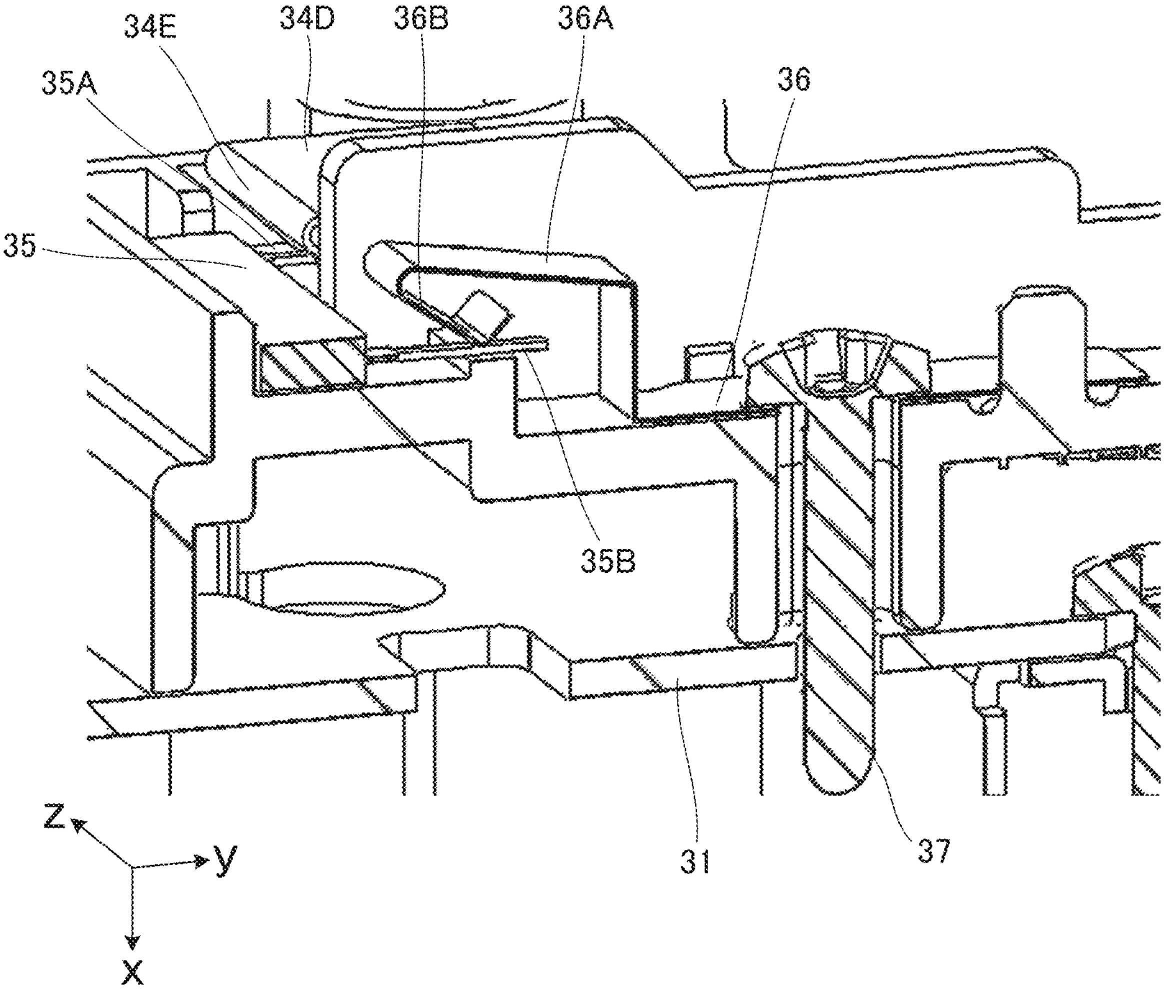
FIG. 12 is a perspective view showing in magnification the upper conductive plate, a resistive element, a lower conductive plate, and surrounding portions of them.

FIG. 12 is a perspective view showing in magnification the upper conductive plate 34, the resistive element 35, a lower conductive plate 36, and surrounding portions of them. As shown in FIGS. 12 and 8, the leads 35A and 35B of the resistive element 35 are drawn from both the respective ends of the resistive element 35.

The upper conductive plate 34 includes a bent portion 34D. A distal side of the bent portion 34D is formed into a distal portion 34E bent in a triangle shape as viewed from above. The bent portion 34D of the upper conductive plate 34 is elastically deformed and the lead 35A extending from one end of the resistive element 35 is clamped between the distal portion 34E of the bent portion 34D and the synthetic resin molded member of the body frame 30 by the elastic force of the bent portion 34D. Thus, the upper conductive plate 34 is electrically connected with the resistive element 35 by bringing the lead 35A extending from the one end of the resistive element 35 into tight contact against the upper conductive plate 34.

Likewise, the lower conductive plate 36 includes: a bent portion 36A; and a distal portion 36B formed as a distal-side portion of the bent portion 36A and bent in a triangle shape as viewed from above. The bent portion 36A of the lower conductive plate 36 is elastically deformed and the lead 35B extending from the other end of the resistive element 35 is clamped between the distal portion 36B of the bent portion 36A and the synthetic resin molded member of the body frame 30 by the elastic force of the bent portion 36A. Thus, the lower conductive plate 36 is electrically connected with the resistive element 35 by bringing the lead 35B extending from the other end of the resistive element 35 into tight contact against the lower conductive plate 36.

Furthermore, as shown in FIG. 12, the screw 37 is screwed through a hole in the lower conductive plate 36 and the synthetic resin molded member of the body frame 30 into the metallic frame side plate 31, thus fastening the lower conductive plate 36. In this manner, the screw 37 electrically connects the lower conductive plate 36 with the frame side plate 31.

As thus far described, in this embodiment, one arm 33B of the torsion spring 33 contacts and is electrically connected with the one end 25A of the stay sheet metal 25, the other arm 33C of the torsion spring 33 contacts and is electrically connected with the upper conductive plate 34, the one end 22B of the shaft 22A of the pressure roller 22 contacts and is electrically connected with the bent portion 34B of the upper conductive plate 34, the bent portion 34D of the upper conductive plate 34 contacts and is electrically connected with the lead 35A extending from one end of the resistive element 35, the bent portion 36A of the lower conductive plate 36 contacts and is electrically connected with the lead 35B extending from the other end of the resistive element 35, and the screw 37 electrically connects the lower conductive plate 36 with the frame side plate 31. Furthermore, the frame side plate 31 is fastened and electrically connected to the sheet metal member of the body frame 30.

Figure 13:
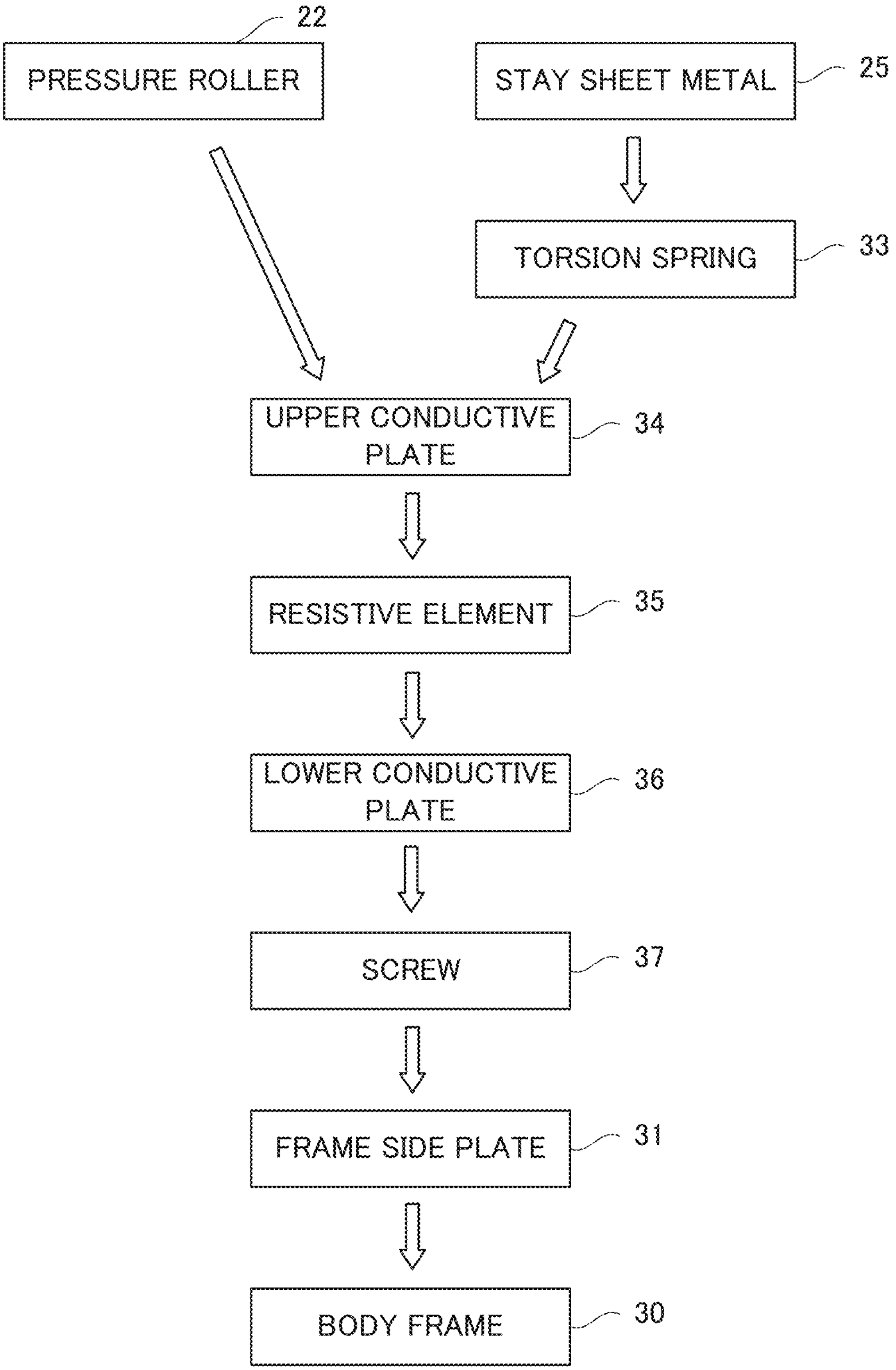
FIG. 13 is a diagram for illustrating a first current path from the stay sheet metal to the body frame and a second current path from the pressure roller to the body frame.

Therefore, as shown in FIG. 13, a first current path is formed in order of the stay sheet metal 25, the torsion spring 33, the upper conductive plate 34, the resistive element 35, the lower conductive plate 36, the screw 37, the frame side plate 31, and the body frame 30. As a result, the stay sheet metal 25 is grounded through the resistive element 35 to the body frame 30. In addition, since the fixing belt 21, the sheet heater 23, and the heater holder 24 are in contact with or have a very short insulation distance from the stay sheet metal 25, the fixing belt 21, the sheet heater 23, and the heater holder 24 are also grounded through the resistive element 35 to the body frame 30.

On the other hand, a second current path is formed in order of the shaft 22A of the pressure roller 22, the upper conductive plate 34, the resistive element 35, the lower conductive plate 36, the screw 37, the frame side plate 31, and the body frame 30. As a result, the pressure roller 22 is grounded through the resistive element 35 to the body frame 30.

Both the first current path and the second current path pass direct current and alternating current. Therefore, the safety of the user's work, such as the removal of a recording paper sheet jammed between the fixing belt 21 and the pressure roller 22, can be ensured.

In comparison between the first current path and the second current path, the upper conductive plate 34, the resistive element 35, the lower conductive plate 36, the screw 37, and the frame side plate 31 are shared between both the current paths and only the torsion spring 33 is a dedicated component of the first current path. Therefore, a single resistive element is used and the current paths for grounding is simplified.

Furthermore, since the stay sheet metal 25 is connected through the torsion spring 33 to the upper conductive plate 34 and the pressure roller 22 is connected to the upper conductive plate 34, the stay sheet metal 25 and the pressure roller 22 can be equalized in potential and the potential can be stably maintained.

Although in the above embodiment a black-and-white printer is used as the image forming apparatus 1 according to the present disclosure, this is merely illustrative and the image forming apparatus according to the present disclosure may be a multicolor printer, other types of electronic apparatuses, such as a multifunction peripheral or a copy machine, or other types of image forming apparatuses, such as a facsimile machine.

The structure and processing described with reference to FIGS. 1 to 13 are merely an embodiment of the present disclosure and not intended to limit the present disclosure to these structure and processing.

While the present disclosure has been described in detail with reference to the embodiments thereof, it would be apparent to those skilled in the art the various changes and modifications may be made therein within the scope defined by the appended claims.

What is claimed is:

1. A fixing device comprising:

an endless fixing belt;

a pressure roller capable of being brought into tight contact against the fixing belt;

a heater which is provided on an inside of the fixing belt, receives through the fixing belt a pressure due to tight contact against the pressure roller, and heats the fixing belt;

a support sheet metal which is provided in an interior of the fixing belt and supports the heater;

a first conductive member that contacts an end of the support sheet metal projecting laterally beyond an edge of the fixing belt;

a second conductive member that contacts an end of the pressure roller; and a resistive element, wherein the first conductive member is engaged and connected to the second conductive member and the second conductive member is connected through the resistive element to a body to which the fixing device is mounted, wherein an end of a shaft of the pressure roller is formed into a conical shape having an apex at which a center of rotation of the pressure roller projects farthest laterally in a direction of extension of the shaft, and the second conductive member is pressed against the apex of the conical shape by an elastic force of the second conductive member.

2. The fixing device according to claim 1, further comprising a sliding bearing made of synthetic resin and supporting the shaft of the pressure roller rotatably.

3. An image forming apparatus comprising:

the fixing device according to claim 1; and an image forming device that forms an image on a recording paper sheet, wherein the fixing device pinches the recording paper sheet in a nip area between the fixing belt and the pressure roller and fixes the image formed on the recording paper sheet by heat and pressure.

4. A fixing device comprising:

an endless fixing belt;

a pressure roller capable of being brought into tight contact against the fixing belt;

a heater which is provided on an inside of the fixing belt, receives through the fixing belt a pressure due to tight contact against the pressure roller, and heats the fixing belt;

a support sheet metal which is provided in an interior of the fixing belt and supports the heater;

a first conductive member that contacts an end of the support sheet metal projecting laterally beyond an edge of the fixing belt;

a second conductive member that contacts an end of the pressure roller; and a resistive element, wherein the first conductive member is engaged and connected to the second conductive member and the second conductive member is connected through the resistive element to a body to which the fixing device is mounted, wherein the first conductive member is pressed against the support sheet metal by an elastic force of the first conductive member.

5. A fixing device comprising:

an endless fixing belt;

a pressure roller capable of being brought into tight contact against the fixing belt;

a heater which is provided on an inside of the fixing belt, receives through the fixing belt a pressure due to tight contact against the pressure roller, and heats the fixing belt;

a support sheet metal which is provided in an interior of the fixing belt and supports the heater;

a first conductive member that contacts an end of the support sheet metal projecting laterally beyond an edge of the fixing belt;

a second conductive member that contacts an end of the pressure roller; and a resistive element, wherein the first conductive member is engaged and connected to the second conductive member and the second conductive member is connected through the resistive element to a body to which the fixing device is mounted, the fixing device further comprises at least one different conductive member, wherein the resistive element is connected through the at least one different conductive member to a body frame to which the fixing device is mounted, wherein the different conductive member comprises a metallic frame side plate connected to the body frame, a conductive plate connected to the resistive element, and a screw that electrically connects the conductive plate with the frame side plate.

* * * * *